United States Patent
Ushioda et al.

(10) Patent No.: US 7,727,574 B1
(45) Date of Patent: Jun. 1, 2010

(54) METHOD OF PRODUCING WATER-CONTAINING CHOCOLATES

(75) Inventors: Toshio Ushioda, Yawara-mura (JP); Masayuki Matsui, Yawara-mura (JP); Haruyasu Kida, Yawara-mura (JP)

(73) Assignee: Fuji Oil Company, Limited, Osaka (JP)

( * ) Notice: Subject to any disclaimer, the term of this patent is extended or adjusted under 35 U.S.C. 154(b) by 1615 days.

(21) Appl. No.: 10/472,525

(22) PCT Filed: Mar. 11, 2002

(86) PCT No.: PCT/JP02/02267
§ 371 (c)(1),
(2), (4) Date: Sep. 24, 2003

(87) PCT Pub. No.: WO02/080692
PCT Pub. Date: Oct. 17, 2002

(30) Foreign Application Priority Data

Mar. 30, 2001 (JP) .............................. 2001-097891

(51) Int. Cl.
*A23G 1/00* (2006.01)

(52) U.S. Cl. ...................................... 426/631; 426/607

(58) Field of Classification Search ................ 426/601, 426/607, 631
See application file for complete search history.

(56) References Cited

U.S. PATENT DOCUMENTS

| | | | |
|---|---|---|---|
| 3,270,040 A * | 8/1966 | Bradshaw et al. ........... 554/223 |
| 4,205,095 A | 5/1980 | Pike et al. |
| 4,594,259 A * | 6/1986 | Baker et al. ................ 426/613 |
| 4,888,196 A * | 12/1989 | Ehrman et al. .............. 426/601 |
| 5,023,106 A * | 6/1991 | Ehrman et al. .............. 426/660 |
| 5,066,510 A * | 11/1991 | Ehrman et al. .............. 426/607 |
| 5,120,566 A * | 6/1992 | Baba et al. .................. 426/631 |
| 5,342,644 A * | 8/1994 | Cain et al. .................. 426/660 |
| 5,576,045 A * | 11/1996 | Cain et al. .................. 426/607 |
| 5,589,216 A * | 12/1996 | Guskey et al. .............. 426/607 |
| 5,599,574 A * | 2/1997 | Guskey et al. .............. 426/660 |
| 5,932,275 A * | 8/1999 | Nalur .......................... 426/607 |
| 6,159,526 A * | 12/2000 | Morikawa et al. ........... 426/611 |
| 6,165,540 A * | 12/2000 | Traitler et al. ................ 426/631 |
| 6,210,739 B1 * | 4/2001 | Nalur .......................... 426/607 |
| 6,391,356 B1 * | 5/2002 | Willcocks et al. ........... 426/306 |
| 6,537,602 B1 * | 3/2003 | Kawabata et al. ........... 426/283 |
| 6,737,100 B1 | 5/2004 | Matsui et al. |
| 7,186,435 B2 * | 3/2007 | Beckett et al. .............. 426/631 |

FOREIGN PATENT DOCUMENTS

| | | |
|---|---|---|
| EP | 0791297 A2 | 8/1997 |
| JP | H06-007086 A | 1/1994 |
| JP | H10-075713 A | 3/1998 |
| WO | WO00/57715 | 10/2000 |

OTHER PUBLICATIONS

Bailey, A. E. 1950. Melting and Solidification of Fats, Interscience Publishers, Inc., New York, p. 160-161.*
Minifie, B. W, 1970. Chocolate, Cocoa and Confectionery: Science and Technology, $2^{nd}$ edition. AVI Publishing Company,Inc., Westport, CT. p. 145-149.*
Swern, D. editon, 1979. Baileys Industrial Oil and Fat Products, vol. 1, 4th edition. Wiley & Sons, New York. p. 322-325.*
Firestone, D. 1999. Physical and Chemical Characteristics of Oils, Fats, and Waxes. AOCS Press. Champaign, III, p. 32, 33, 85, 71.*
Davis, T. 1989. JAOCS 66(10)1474.*
Firestone, D. 1999. Physical and Chemical Characteristics of Oils, Fats and Waxes. AOCS Press. Champaign, III. p. 28-29.*
Kartha A. R. S. et al., The Glyceride Structure of Natural Fats. III. Factors Governing the Content of Fully Saturated Glycerides. J. Am. Oil Chem. So., 1954, vol. 31, pp. 85-88.

* cited by examiner

*Primary Examiner*—Carolyn A Paden
(74) *Attorney, Agent, or Firm*—Global IP Counselors, LLP

(57) ABSTRACT

The present invention provides a method of producing water-containing chocolates in which an aqueous component and a fat and oil composition containing tri-saturated fatty acid glyceride crystals dispersed in a fat or oil whose melting point is at or below body temperature are added to and emulsified with a chocolate mass.

12 Claims, No Drawings

METHOD OF PRODUCING WATER-CONTAINING CHOCOLATES

BACKGROUND OF THE INVENTION

1. Field of the Invention

The present invention relates to water-containing chocolates, and more specifically to a method for producing water-containing chocolates which, even when moisture is added thereto, are not noticeably gritty due to the coagulation of the solid contents thereof, do not have an abrupt increase in viscosity, and have a desirable flavor.

2. Background Information

There are a variety of water-containing chocolates in the prior art, from those which contain a small amount of moisture to those which contain a large amount of moisture. For example, a method of producing water-containing chocolates has been proposed (Japanese unexamined patent application publication S60-27339) in which a standard chocolate is molded not by adding substances thereto having a high water content, such as cream, milk, or the like, but rather by using a specific lipophilic emulsifier to produce a water-in-oil emulsion in which the fat in these high water content substances is emulsified. This emulsion is then added to the chocolate as an aqueous component. However, specialized equipment is needed to prepare a water-in-oil emulsion, the method is complex because the number of steps in the production process is increased, and thus is disadvantageous from an economic point of view.

In addition, a method has also been proposed in which an aqueous component is added as is to chocolate (Japanese unexamined patent application publications 556-28131 and H03-164137). This type of method is not widely used because the aqueous component is limited to liquid sugar, condensed cream, or the like.

Another typical water-containing chocolate product is a ganache, which is produced by mixing a chocolate mass with cream. This is an extremely delicious food product that melts in the mouth and in which the rich flavor of cream and chocolate spread within the mouth when eaten. It is used as an ingredient in high quality confections. This type of ganache is prepared by first heating and melting chocolate, and then mixing heat sterilized cream therewith. However, this emulsion is extremely unstable, will separate when used, is difficult to work with due to abrupt increases in viscosity, and it is difficult to reproduce a ganache that has favorable physical characteristics.

SUMMARY OF THE INVENTION

Because, up until now, ganaches could only be used in a limited number of applications because they cannot be molded and are extremely unstable in the emulsified state, an object of the present invention is to produce a water-containing chocolate having superior workability, a wide range of applications, a smoothness not found in the prior art, as well as a soft mouth feel when bitten into.

As a result of taking the aforementioned points into consideration and diligent research, it was discovered that a standard chocolate mass found in the prior art could be used to produce a water-containing chocolate having excellent flavor, and thereby achieve the present invention.

In other words, the present invention provides a method of producing water-containing chocolates in which an aqueous component and a fat/oil composition comprised of tri-saturated fatty acid glyceride crystals dispersed in a fat/oil whose melting point is at or below body temperature are added to and emulsified with a chocolate mass.

These and other objects, features, aspects and advantages of the present invention will become apparent to those skilled in the art from the following detailed description, which discloses preferred embodiments of the present invention.

DETAILED DESCRIPTION OF THE PREFERRED EMBODIMENTS

In the present invention, the fat/oil whose melting point is at or below body temperature includes a vegetable oil such as soybean oil, rapeseed oil, corn oil, cottonseed oil, peanut oil, sunflower seed oil, rice bran oil, safflower oil, olive oil, sesame oil, palm oil, coconut oil, palm kernel oil, and the like, and an animal fat or oil such as beef fat, pork fat, fish oil, whale oil, milk fat, and the like. Any of these fats or oils may be fractionated, hydrogenated, or be ester exchanged, and may be used in combination with each other.

The use of a fat or oil that is in the liquid state at 20° C. is preferred. When a mixed oil comprised of a fat or oil that is in the liquid state at 20° C. and tri-saturated fatty acid glyceride crystals is added to and emulsified with a chocolate mass, the workability thereof will be improved because it will be fluid in a wide temperature band even if the tri-saturated fatty acid glyceride is in the crystal state.

In addition, it is preferred that a hard butter be used, e.g., cocoa butter, a tempering fat/oil such as a cocoa butter equivalent, or a trans type hard butter in which elaidic acid is the constituent fatty acid. When a mixed oil comprising a hard butter and tri-saturated fatty acid glyceride crystals are added to and emulsified with a chocolate mass, the heat tolerance of the water-containing chocolate obtained thereby will improve.

The tri-saturated fatty acid glyceride of the present invention is a triglyceride in which the constituent fatty acids thereof are all saturated fatty acids. The tri-saturated fatty acid glyceride that can be employed in the present invention is a fat/oil having an iodine value of 2 or less due to hydrogenation or the like, or a fatty acid composition in which the constituent fatty acid glyceride has almost no double bonds, e.g., an oil that had been hardened to the maximum degree possible. Examples of these include rice bran oil, palm oil, and high erucic acid rapeseed oil that have been hydrogenated to an iodine value of 2 or less and hardened to a melting point of 57° C. or higher.

A tri-saturated fatty acid glyceride that contains behenic acid is preferred. In the present invention, tri-saturated fatty acid glycerides that contain behenic acid are, for example, oils containing 30% or more behenic acid having an iodine value of 1 or less due to hydrogenation and a melting point of 60° C. or higher. Examples of oils containing 30% or more behenic acid include high erucic acid rapeseed oil, mustard seed oil, crambe oil, uzen baren seed oil, and the like. However, a high erucic acid rapeseed oil that can be easily obtained is preferred.

In the present invention, it is preferred that the tri-saturated fatty acid glyceride in the fat/oil composition comprised of tri-saturated fatty acid glyceride crystals dispersed in a fat/oil whose melting point is at or below body temperature be present in the water-containing chocolate at a concentration of between 0.05 and 4.0 wt %, and more preferably between 0.1 and 3 wt %. When the amount thereof exceeds 4.0 wt %, the viscosity of the chocolate during emulsification will increase dramatically, and the chocolate will solidify due to the heat generated during emulsification. The water-containing chocolate will be made heat tolerant if it were further emulsified, but its ability to melt in the mouth would be extremely poor, and its commercial value as a confection will drop considerably. On the other hand, when the amount of tri-saturated fatty acid glyceride in the water-containing chocolate is less than 0.05 wt %, the emulsification will become unstable and thus is not preferred.

In the present invention, a fat/oil composition comprised of a fat or oil whose melting point is at or below body temperature and tri-saturated fatty acid glyceride crystals dispersed therein can be obtained by first completely melting a mixed oil comprised of a fat/oil whose melting point is at or below body temperature and tri-saturated fatty acid glycerides, cooling the mixed oil until the temperature thereof reaches 30 to 45° C. and crystals are precipitated therein, and then further cooling this composition. Thus, a fat or oil composition is obtained in which tri-saturated fatty acid glyceride crystals are dispersed in a fat/oil whose melting point is lower than that of the crystals. These crystals can ideally be used as an additive that confers a hydrating function.

In addition, in another method, the fat/oil composition can be produced by first completely melting a mixed fat/oil comprised of a fat/oil whose melting point is at or below body temperature and tri-saturated fatty acid glycerides, mixing this mixture with a device such as an Onlator or the like, cooling the mixed fat/oil until the temperature thereof reaches 30 to 45° C. and crystals are precipitated therein, and then further cooling the composition. When methods other than these are employed, e.g., simply leaving the mixed fat/oil as is at room temperature and allowing it to gradually cool, the crystals will become too large and thus will become ill-suited for emulsifying the aqueous component with the chocolate. In the present invention, it is necessary to add and emulsify the fat/oil composition comprised of a fat/oil whose melting point is at or below body temperature and tri-saturated fatty acid glyceride crystals dispersed therein at a temperature that does not melt the tri-saturated fatty acid glyceride crystals. In particular, the tri-saturated fatty acid glyceride must be in the crystal state. When the tri-saturated fatty acid glyceride is in the crystal state, they will not interact with other fats or oils, e.g., the cocoa butter or the like in the chocolate mass, and thus the ability of the chocolate to melt in the mouth will not worsen. However, when the tri-saturated fatty acid glyceride is used in the completely melted state, not only will there be an insufficient quantity of crystals for emulsification and the emulsification function thereof will decline, but the ability of the chocolate to melt in the mouth will worsen because the tri-saturated fatty acid glyceride will interact with the cocoa butter or the like in the chocolate mass. Thus, the temperature of the chocolate mass must be held in a range of between 25 and 40° C. In addition, the fat/oil composition comprised of a fat/oil whose melting point is at or below body temperature and tri-saturated fatty acid glyceride crystals dispersed therein is also held in this temperature range, and is mixed with the chocolate mass and emulsified therewith. However, when a tempering type of chocolate mass is used, it will be necessary to conduct the tempering at a temperature that will not destroy the stable crystals therein, e.g., approximately 31° C. Furthermore, the tempering process can be conducted after the fat/oil compound and aqueous component are added to and emulsified with the chocolate mass.

The chocolate mass of the present invention is not limited to a chocolate mass in which the fat or oil component thereof is required by industry standards or statute to be comprised of cocoa butter only, but also includes a variety of chocolate masses that use hard butter instead of cocoa butter as a cocoa butter substitute. Thus, not only can commercially available chocolates such as sweet chocolate or milk chocolate be used, but a chocolate mass can also be used which is obtained by rolling and conching one or more types of cacao mass, cocoa powder, cocoa butter, hard butter, or the like together with other ingredients according to standard methods. In addition, white chocolate can also be used in the present invention, and is obtained by using solids such as cocoa butter or hard butter, sugar, whole or skim milk powder, and the like without using cocoa or cacao mass. Colored chocolate can also be used in the present invention, which is white chocolate in which flavoring agents such as coffee, fruit, or the like are employed to produce various flavors and colors therein.

In the present invention, one or more types of substances can be used as the aqueous component, examples of which include water, liquid sugar, natural cream, milk, various filled creams that have been developed in the prior art that use animal or plant fats or oils, synthetic creams disclosed in various prior art patent publications, condensed milk, various fruits, fruit juices, natural honey, liqueurs, or the like.

In the present invention, the amount of these aqueous components to be used in the water-containing chocolates is between 2 to 30 wt %, and preferably 3 to 20 wt %. The mouth feel of the water-containing chocolates tends to become heavy when the amount of moisture therein is less than 2 wt %. If the amount of moisture contained in the water-containing chocolate exceeds 30 wt %, not only will the workability thereof will worsen, but it will become difficult to maintain a stable emulsion therein.

Emulsifiers known in the prior art can be used in the present invention, such as lethicin, lysolecithin, glycerine fatty acid ester, sucrose fatty acid ester, organic acid esters, polyglycerine fatty acid esters, polyglycerine condensed ricinoleic acid, and the like, in amounts that do not impact the effects of the present invention. In addition to the ingredients noted above, phosphates, gums, sugars, or the like may be added to the water-containing chocolate as appropriate.

In a general method of producing the water-containing chocolate the present invention, it is necessary to heat and melt the chocolate mass noted above, and then add and emulsify the fat/oil composition comprised of a fat/oil whose melting point is at or below body temperature and tri-saturated fatty acid glyceride crystals dispersed therein at a temperature that does not melt the tri-saturated fatty acid glyceride crystals. The aqueous component may be heated to approximately the same temperature as the melted chocolate mass and then mixed in. The emulsification means is not particularly limited, but it is preferred that all of the ingredients are swiftly mixed together into a uniform mass after all of the ingredients have been brought together.

After the water-containing chocolate of the present invention is poured into a mold or a flat container and cooled until solid, it may be cut or formed into shapes with a die cutter, or served as is. This water-containing chocolate will have a mouth feel that is soft when bitten into like an oil-in-water type ganache, will have a superior flavor that is not seen in water-containing chocolates which use conventional emulsifiers, and will be stable over a long period of time.

EXAMPLES

Examples of the present invention will be used below to describe the present invention in greater detail. However, the present invention is not limited to the examples below. Note that in the examples, the symbol "%" and the word "part(s)" used therein refer to weight.

The melting point in the examples was measured by the experimental method described in Section 2.2.4.2 Melting Point (rising melting point) of the "Standard Methods for the Analysis of Fats and Oils" published by the Japan Oil Chemists' Society (1996 edition). In addition, the fatty acid composition was measured by the experimental method described in 2.4.1.2 Methyl Esterification Method (Boron Trifluoride/Methanol Method).

Method of preparing a fat/oil composition comprised of a fat/oil whose melting point is at or below body temperature and tri-saturated fatty acid glyceride crystals dispersed therein After completely melting a mixed oil at 80° C. that contains a fat/oil whose melting point is at or below body temperature and tri-saturated fatty acid glyceride, the mixed fat/oil was placed in a 15° C. water bath and stirred until the mixed fat/oil was cooled to between 30 and 45° C. and crystals were dispersed therein, thereby obtaining a fat/oil composition comprised of a fat/oil whose melting point is at or below body temperature and tri-saturated fatty acid glyceride crystals dispersed therein. This fat/oil composition was held at 20° C.

Example 1

A mixed oil containing 90 parts of a slightly hydrogenated, low erucic acid rapeseed oil (iodine value 95, melting point 10° C.) (a fat/oil having a melting point at or lower than body temperature) and 10 parts of a rice bran oil that was hydrogenated to the maximum degree possible (iodine value 1 or less, melting point 62° C.) (tri-saturated fatty acid glyceride) was obtained by means of the aforementioned method, and held at 20° C. 10 parts of this fat/oil composition was heated to 30° C., and was mixed with 70 parts of a tempered standard sweet chocolate (34% oil content) at 30° C. Next, 20 parts of cream (butterfat content 45%) that was heated to 30° C. was stirred into this mixture, thereby producing a water-containing chocolate having a moisture content of 10%. This water-containing chocolate contained 1.0 wt % of tri-saturated fatty acid glyceride. The water-containing chocolate obtained thereby was determined to be a water-in-oil type of emulsion as a result of testing with an electric current. After spreading this water-containing chocolate into a sheet and cooling it to 5° C., it was cut with a piano wire. There was almost no chocolate adhered to the piano wire, and the workability of the chocolate was excellent. In addition, the chocolate was quite delicious, was soft when bitten into, and had a smooth mouth feel.

Example 2

A mixed oil containing 90 parts of a slightly hydrogenated, low erucic acid rapeseed oil (iodine value 95, melting point 10° C.) (a fat/oil having a melting point at or lower than body temperature) and 10 parts of a high erucic acid rapeseed oil that was hydrogenated to the maximum degree possible (containing 45% behenic acid, iodine value 1 or less, melting point 62° C.) (behenic acid containing tri-saturated fatty acid glyceride) was obtained by means of the aforementioned method, and held at 20° C. 10 parts of this fat/oil composition was heated to 30° C., and was mixed with 60 parts of a tempered standard milk chocolate (36% oil content) at 30° C. Next, 30 parts of cream (butterfat content 45%) that was heated to 30° C. was stirred into this mixture, thereby preparing a water-containing chocolate having a moisture content of 15%. This water-containing chocolate contained 1.0 wt % of behenic acid containing tri-saturated fatty acid glyceride. The water-containing chocolate obtained thereby was a stable water-in-oil emulsification, even though milk chocolate was used. After spreading this water-containing chocolate into a sheet and cooling it to 5° C., it was cut with a piano wire. There was almost no chocolate adhered to the piano wire, and the workability of the chocolate was excellent. In addition, the chocolate was quite delicious, was soft when bitten into, and had a smooth mouth feel.

Comparative Example 1

A mixed oil containing 90 parts of a slightly hydrogenated, low erucic acid rapeseed oil (iodine value 95, melting point 10° C.) (a fat/oil having a melting point at or lower than body temperature) and 10 parts of a high erucic acid rapeseed oil that was hydrogenated to the maximum degree possible (containing 45% behenic acid, iodine value 1 or less, melting point 62° C.) (behenic acid containing tri-saturated fatty acid glyceride) was obtained by means of the aforementioned method, and held at 20° C. 10 parts of this fat/oil composition was completely melted, was mixed with 60 parts of a standard milk chocolate (36% oil content), and this mixture was then tempered at 30° C. Next, 30 parts of cream (butterfat content 45%) that was heated to 30° C. was stirred into this mixture. The water-containing chocolate obtained thereby was gritty due to the coagulation of the solid contents thereof, the fat and oil in the chocolate separated out when the chocolate was stirred, and the emulsion was destroyed.

Comparative Example 2

A mixed oil containing 90 parts of a slightly hydrogenated, low erucic acid rapeseed oil (iodine value 95, melting point 10° C.) (a fat/oil having a melting point at or lower than body temperature) and 10 parts of a behenic acid monoglyceride (Poem B-100, produced by Riken Vitamin Corp.) (which replaced the behenic acid containing tri-saturated fatty acid glyceride used in Example 2 and Comparative Example 1) was obtained by means of the aforementioned method, and held at 20° C. 10 parts of this fat/oil composition was heated to 30° C., and was mixed with 70 parts of a tempered standard milk chocolate (36% oil content) at 30° C. Next, 20 parts of cream (butterfat content 45%) that was heated to 30° C. was stirred into this mixture. The water-containing chocolate obtained thereby was gritty due to the coagulation of the solid contents thereof, the fat and oil in the chocolate separated out when the chocolate was stirred, and the emulsion was destroyed.

The compositions and results of the water-containing chocolates of Example 1, Example 2, Comparative Example 1 and Comparative Example 2 are shown in Table 1.

TABLE 1

| | | Example 1 | Example 2 | Comparative Example 1 | Comparative Example 2 |
|---|---|---|---|---|---|
| 1 | Fat/oil having a melting point at or lower than body temperature | Slightly hydrogenated low erucic acid rapeseed oil (melting point 10° C.) | Slightly hydrogenated low erucic acid rapeseed oil (melting point 10° C.) | Slightly hydrogenated low erucic acid rapeseed oil (melting point 10° C.) | Slightly hydrogenated low erucic acid rapeseed oil (melting point 10° C.) |

TABLE 1-continued

|  | Example 1 | Example 2 | Comparative Example 1 | Comparative Example 2 |
|---|---|---|---|---|
| 2 Tri-saturated fatty acid glyceride or other high melting point fat/oil | Rice bran oil hardened to the maximum degree possible | High erucic acid rapeseed oil hardened to the maximum degree possible | High erucic acid rapeseed oil hardened to the maximum degree possible | B-100 (behenic acid monoglyceride) |
| 3 Ratio of 1 to 2 | 90:10 | 90:10 | 90:10 | 90:10 |
| Temperature | 30° C. | 30° C. | 30° C. | 30° C. |
| % fat/oil composition | 10 | 10 | 10 | 10 |
| Chocolate type | Sweet | Milk | Milk | Milk |
| Oil content of chocolate | 34% | 36% | 36% | 36% |
| % chocolate | 70 | 60 | 60 | 70 |
| Tempering temp. of chocolate | 30° C. | 30° C. | 30° C. | 30° C. |
| Type of aqueous component | Cream | Cream | Cream | Cream |
| % aqueous component | 20 | 30 | 30 | 20 |
| Moisture | 10 | 15 | 15 | 10 |
| Temp of aqueous component | 30° C. | 30° C. | 30° C. | 30° C. |
| Workability | Excellent | Excellent | Poor | Poor |
| Emulsification state | Excellent | Excellent | Destroyed | Destroyed |

Example 3

A mixed oil containing 95 parts of a hard butter ("Melano New SS7", produced by Fuji Oil Corp, iodine value 34, melting point 34° C.) (a fat/oil having a melting point at or lower than body temperature) and 5 parts of a high erucic acid rapeseed oil that was hydrogenated to the maximum degree possible (iodine value 1 or less, melting point 64° C.) (behenic acid containing tri-saturated fatty acid glyceride) was obtained by means of the aforementioned method, and held at 20° C. 2 parts of the fat/oil combination was heated to 45° C. (with crystals already dispersed therein), and was mixed with 88 parts of a standard milk chocolate (38% oil content) that was heated to 45° C. This mixture was then tempered at 30° C. Next, 10 parts of cream (butterfat content 45%) that was heated to 30° C. was stirred into this mixture, thereby preparing a water-containing chocolate having a moisture content of 5%. This water-containing chocolate contained 0.1 wt % tri-saturated fatty acid glyceride. The water-containing chocolate obtained thereby was determined to be a water-in-oil type of emulsion as a result of testing with an electric current. After spreading this water-containing chocolate into a sheet and cooling it to 5° C., it was cut with a piano wire. There was almost no chocolate adhered to the piano wire, and the workability of the chocolate was excellent. In addition, the water-containing chocolate produced had a good chocolate flavor, and had an extremely soft and smooth mouth feel.

Comparative Example 3

A mixed oil containing 80 parts of a hard butter ("Melano New SS7", produced by Fuji Oil Corp, iodine value 34, melting point 34° C.) (a fat/oil having a melting point at or lower than body temperature) and 20 parts of a high erucic acid rapeseed oil that was hydrogenated to the maximum degree possible (iodine value 1 or less, melting point 64° C.) (behenic acid containing tri-saturated fatty acid glyceride) was obtained by means of the aforementioned method, and held at 20° C. 25 parts of the fat/oil combination was heated to 45° C. (with crystals already dispersed therein), and was mixed with 55 parts of a standard milk chocolate (36% oil content) that was heated to 45° C. This mixture was then tempered at 30° C. However, the workability of the milk chocolate was extremely poor during mixing because the mixed oil was too hard. Next, when 20 parts of cream (butterfat content 45%) that was heated to 30° C. was stirred into this mixture, the viscosity of the mixture suddenly increased and a good emulsion could not be produced. This water-containing chocolate contained 5.0 wt % of tri-saturated fatty acid glyceride.

The compositions and results of the water-containing chocolates of Example 3 and Comparative Example 3 are shown in Table 2.

TABLE 2

|  | Example 3 | Comparative Example 3 |
|---|---|---|
| 1 Fat/oil having a melting point at or lower than body temperature | Hard butter (melting point 34° C.) | Hard butter (melting point 34° C.) |
| 2 Tri-saturated fatty acid glyceride or other high melting point fat/oil | High erucic acid rapeseed oil hardened to the maximum degree possible | High erucic acid rapeseed oil hardened to the maximum degree possible |
| 3 Ratio of 1 to 2 | 95:5 | 80:20 |
| Temperature | 45° C. | 45° C. |
| % fat/oil composition | 2 | 25 |
| Chocolate type | Milk | Milk |
| Oil content of chocolate | 38% | 36% |
| % chocolate | 88 | 55 |
| Tempering temp. of chocolate | 30° C. | 30° C. |
| Type of aqueous component | Cream | Cream |
| % aqueous component | 10 | 20 |
| Moisture | 5 | 10 |
| Temp. of aqueous component | 30° C. | 30° C. |
| Workability | Excellent | Poor |
| Emulsification state | Excellent | Poor |

Example 4

A mixed oil containing 85 parts of a hard butter ("Melano New SS7", produced by Fuji Oil Corp, iodine value 34, melting point 34° C.) (a fat/oil having a melting point at or lower than body temperature) and 15 parts of a high erucic acid rapeseed oil that was hydrogenated to the maximum degree possible (iodine value 1 or less, melting point 64° C.) (behenic acid containing tri-saturated fatty acid glyceride) was obtained by means of the aforementioned method, and held at 20° C. 20 parts of the fat/oil combination was heated to 45° C. (with crystals already dispersed therein), and was mixed with 60 parts of a standard milk chocolate (36% oil content) that was heated to 45° C. This mixture was then tempered at 30° C.

Next, 20 parts of cream (butterfat content 45%) that was heated to 30° C. was stirred into this mixture, thereby preparing a water-containing chocolate having a moisture content of 10%. The water-containing chocolate obtained thereby was determined to be a water-in-oil type of emulsion as a result of testing with an electric current. After spreading this water-containing chocolate into a sheet and cooling it to 5° C., it was cut with a piano wire. There was almost no chocolate adhered to the piano wire, and the workability of the chocolate was excellent. In addition, the heat tolerant water-containing chocolate produced had a smooth mouth feel, even though the water-containing chocolate contained 3.0 wt % of tri-saturated fatty acid glyceride.

Example 5

A mixed oil containing 90 parts of a slightly hydrogenated, low erucic acid rapeseed oil (iodine value 95, melting point 10° C.) (a fat/oil having a melting point at or lower than body temperature) and 10 parts of a high erucic acid rapeseed oil that was hydrogenated to the maximum degree possible (iodine value 1 or less, melting point 62° C.) (behenic acid containing tri-saturated fatty acid glyceride) was obtained by means of the aforementioned method, and held at 20° C. 10 parts of this fat or oil composition was heated to 30° C., and was mixed with 70 parts of a tempered standard white chocolate (36% oil content) at 30° C. Next, 20 parts of strawberry puree (moisture content 30%) that was heated to 30° C. was stirred into this mixture until uniform, thereby preparing a water-containing chocolate having a moisture content of 6%. This water-containing chocolate contained 1.0 wt % of behenic acid containing tri-saturated fatty acid glyceride. The water-containing chocolate obtained thereby was determined to be a water-in-oil type of emulsion as a result of testing with an electric current. When this water-containing chocolate was poured into a cup and cooled to 5° C., it was found to have a very good strawberry flavor, was soft when bitten into, and had a smooth mouth feel.

Example 6

A mixed oil containing 90 parts of a slightly hydrogenated, low erucic acid rapeseed oil (iodine value 95, melting point 10° C.) (a fat/oil having a melting point at or lower than body temperature) and 10 parts of a high erucic acid rapeseed oil that was hydrogenated to the maximum degree possible (iodine value 1 or less, melting point 62° C.) (behenic acid containing tri-saturated fatty acid glyceride) was obtained by means of the aforementioned method, and held at 20° C. 15 parts of the fat/oil combination was heated to 40° C. (with crystals already dispersed therein), and was mixed with 65 parts of a no-temper chocolate (36% oil content) that was heated to 40° C. Next, 10 parts of cream (butterfat content 45%) that was heated to 30° C. and 5 parts of liquid sugar (moisture content 30%, reduced starch sweetener) were mixed together, an aqueous component heated to 40° C. was then stirred into this mixture, thereby preparing a water-containing chocolate having a moisture content of 6.5%. This water-containing chocolate contained 1.5 wt % of behenic acid containing tri-saturated fatty acid glycerides. The water-containing chocolate obtained thereby was determined to be a water-in-oil type of emulsion as a result of testing with an electric current. After spreading this water-containing chocolate into a sheet and cooling it to 5° C., it was cut with a piano wire. There was almost no chocolate adhered to the piano wire, and the workability of the chocolate was excellent. In addition, the chocolate was delicious, was soft when bitten into, and had a smooth mouth feel.

The compositions and results of the water-containing chocolates of Example 4, Example 5, and Example 6 are shown in Table 3.

TABLE 3

|   | | Example 4 | Example 5 | Example 6 |
|---|---|---|---|---|
| 1 | Fat/oil having a melting point at or lower than body temperature | Hard butter (melting point 34° C.) | Slightly hydrogenated low erucic acid rapeseed oil (melting point 10° C.) | Slightly hydrogenated low erucic acid rapeseed oil (melting point 10° C.) |
| 2 | Tri-saturated fatty acid glyceride or other high melting point fat/oil | High erucic acid rapeseed oil hardened to the maximum degree possible | High erucic acid rapeseed oil hardened to the maximum degree possible | High erucic acid rapeseed oil hardened to the maximum degree possible |
| 3 | Ratio of 1 to 2 | 85:15 | 90:10 | 90:10 |
|   | Temperature | 45° C. | 30° C. | 40° C. |
|   | % fat/oil composition | 20 | 10 | 15 |
|   | Chocolate type | Milk | White | No-temper |
|   | Oil content of chocolate | 36% | 36% | 36% |
|   | % chocolate | 60 | 70 | 70 |
|   | Tempering temp. of chocolate | 30° C. | 30° C. | 40° C. |
|   | Type of aqueous component | Cream | Strawberry puree | Cream/liquid sugar |
|   | % aqueous component | 20 | 20 | 15 |
|   | Moisture | 10 | 6 | 6.5 |
|   | Temp. of aqueous component | 30° C. | 30° C. | 40° C. |
|   | Workability | Excellent | Excellent | Excellent |
|   | Emulsification state | Excellent | Excellent | Excellent |

The present invention provides a method for producing water-containing chocolates which, even when moisture is added to various water-containing chocolates developed thereby, are not noticeably gritty due to the coagulation of the solid contents thereof, do not have an abrupt increase in viscosity, and have excellent flavor.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

The invention claimed is:

1. A method of producing a water-containing chocolate, the method comprising the steps of:
    preparing a fat/oil composition comprised of a fat/oil whose melting point is at or below body temperature and tri-saturated fatty acid glyceride dispersed therein by completely melting the fat/oil and the tri-saturated fatty acid glyceride, and the ratio between the fat/oil and the tri-saturated fatty acid glyceride of the fat/oil composition is between 80:20 and 95:5;
    cooling the fat/oil composition to a temperature in a range of between 30° C. and 45° C. so that the tri-saturated fatty acid glyceride crystals remains dispersed therein;
    adding an aqueous component and the cooled fat/oil composition to a chocolate mass whose temperature is held in a range of between 25° C. and 40° C.; and
    dispersing and/or emulsifying the aqueous component, fat/oil composition, and chocolate mass mixture,
    the tri-saturated fatty acid glyceride being selected from the group consisting of:
        rice bran oil that has been hydrogenated to an iodine value of 2 or less and hardened to a melting point of 57° C. or higher,
        palm oil that has been hydrogenated to an iodine value of 2 or less and hardened to a melting point of 57° C. or higher, and
        high erucic acid rapeseed oil that has been hydrogenated to an iodine value of 2 or less and hardened to a melting point of 57° C. or higher.

2. The method of producing a water-containing chocolate set forth in claim 1, wherein the fat/oil of the fat/oil composition is a fat or an oil in a liquid state at 20° C. or a hard butter.

3. The method of producing a water-containing chocolate set forth in claim 1, wherein the water-containing chocolate contains 0.05 to 4 wt % of the tri-saturated fatty acid glyceride.

4. A method of producing a water-containing chocolate, the method comprising the steps of:
    completely melting a mixed oil comprised of a fat/oil whose melting point is at or below body temperature and tri-saturated fatty acid glyceride to form a fat/oil composition, with the ratio between the fat/oil and tri-saturated fatty acid glyceride of the fat/oil composition is between 80:20 and 95:5;
    cooling the fat/oil composition to a temperature in a range of between 30° C. and 45° C.;
    adding an aqueous component and the fat/oil composition to a chocolate mass whose temperature is held in a range of between 25° C. and 40° C.; and
    dispersing and/or emulsifying the aqueous component, fat/oil composition, and chocolate mass mixture,
    the tri-saturated fatty acid glyceride is selected from the group consisting of:
        rice bran oil that has been hydrogenated to an iodine value of 2 or less and hardened to a melting point of 57° C. or higher,
        palm oil that has been hydrogenated to an iodine value of 2 or less and hardened to a melting point of 57° C. or higher, and
        high erucic acid rapeseed oil that has been hydrogenated to an iodine value of 2 or less and hardened to a melting point of 57° C. or higher.

5. The method of producing a water-containing chocolate set forth in claim 1, wherein the tri-saturated fatty acid glyceride is a tri-saturated fatty acid glyceride containing behenic acid.

6. A method of producing a water-containing chocolate, the method comprising the steps of:
    preparing a fat/oil composition comprised of tri-saturated fatty acid glyceride, the tri-saturated fatty acid glyceride is selected from the group consisting of
        rice bran oil that has been hydrogenated to an iodine value of 2 or less and hardened to a melting point of 57° C. or higher,
        palm oil that has been hydrogenated to an iodine value of 2 or less and hardened to a melting point of 57° C. or higher, and
        high erucic acid rapeseed oil that has been hydrogenated to an iodine value of 2 or less and hardened to a melting point of 57° C. or higher,
    where the constituent fatty acids are dispersed in a fat/oil whose melting point is below body temperature such that both the tri-saturated fatty acid glyceride and the fat/oil are completely melted,
    cooling the fat/oil composition so that the tri-saturated fatty acid glyceride remains dispersed therein,
    preparing an aqueous component such that the aqueous component is between 10 and 30 percent of the water-containing chocolate, and
    preparing a chocolate mass whose temperature is held in a range of between 25° C. and 40° C., and
    dispersing and/or emulsifying the aqueous component, fat/oil composition, and chocolate mass mixture such that the water-containing chocolate contains 0.05 to 4 wt % of the tri-saturated fatty acid glyceride.

7. The method of producing a water-containing chocolate set forth in claim 6, wherein the fat/oil includes one or more of the following soybean oil, rapeseed oil, corn oil, cottonseed oil, peanut oil, sunflower seed oil, rice bran oil, safflower oil, olive oil, sesame oil, palm oil, coconut oil, palm kernel oil, beef fat, pork fat, fish oil, whale oil, milk fat.

8. The method of producing a water-containing chocolate set forth in claim 6, wherein
    the cooling of the fat/oil composition so that the tri-saturated fatty acid glyceride remains dispersed therein includes cooling the fat/oil composition to between 30° C. and 45° C.

9. The method of producing a water-containing chocolate set forth in claim 6, wherein the tri-saturated fatty acid glyceride includes behenic acid.

10. The method of producing a water-containing chocolate set forth in claim 4, wherein the dispersing and/or emulsifying is performed such that water-containing chocolate contains 0.05 to 4 wt % of the tri-saturated fatty acid glyceride.

11. The method of producing a water-containing chocolate set forth in claim 4, wherein the fat/oil of the fat/oil composition is a fat or an oil in a liquid state at 20° C. or a hard butter.

12. The method of producing a water-containing chocolate set forth in claim 4, wherein the tri-saturated fatty acid glyceride is a tri-saturated fatty acid glyceride containing behenic acid.

* * * * *